United States Patent
Nabar et al.

(10) Patent No.: US 9,641,294 B2
(45) Date of Patent: May 2, 2017

(54) SYSTEM, METHOD, AND PROGRAM FOR ROBUST INTERFERENCE REJECTION COMBINING

(71) Applicant: CISCO TECHNOLOGY, INC., San Jose, CA (US)

(72) Inventors: Rohit Umesh Nabar, Sunnyvale, CA (US); Kedar Durgadas Shirali, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 16 days.

(21) Appl. No.: 14/341,563

(22) Filed: Jul. 25, 2014

(65) Prior Publication Data

US 2016/0028516 A1 Jan. 28, 2016

(51) Int. Cl.
| | | |
|---|---|---|
| H04L 5/00 | (2006.01) | |
| H04B 1/7105 | (2011.01) | |
| H04L 25/02 | (2006.01) | |
| H04B 7/08 | (2006.01) | |

(52) U.S. Cl.
CPC ....... *H04L 5/0032* (2013.01); *H04B 1/71055* (2013.01); *H04B 7/0854* (2013.01); *H04B 7/0874* (2013.01); *H04L 25/021* (2013.01); *H04L 25/0238* (2013.01); *H04L 25/0242* (2013.01)

(58) Field of Classification Search
CPC . H04L 5/0032; H04L 25/021; H04L 25/0238; H04L 25/0242; H04B 1/71055; H04B 7/0874; H04B 7/0854
See application file for complete search history.

(56) References Cited

U.S. PATENT DOCUMENTS

| | | | | |
|---|---|---|---|---|
| 8,750,240 B2* | 6/2014 | Balachandran | ....... | H04L 5/0037 370/328 |
| 9,042,428 B2* | 5/2015 | Wang | ................. | H04B 1/71055 375/148 |
| 2006/0072683 A1* | 4/2006 | Kent | .................... | H04B 7/0697 375/267 |
| 2011/0122968 A1* | 5/2011 | Jongren | ............... | H04B 7/0639 375/296 |
| 2012/0008722 A1* | 1/2012 | Serbetli | ................. | H04L 5/0044 375/340 |
| 2012/0014425 A1* | 1/2012 | Zhuang | ................. | H04L 1/0015 375/224 |

(Continued)

FOREIGN PATENT DOCUMENTS

CN 101753176 6/2010

OTHER PUBLICATIONS

Léost, et al., "Interference Rejection Combining in LTE Networks," © 2012 Alcatel-Lucent, Bell Labs Technical Journal 17(1), pp. 25-49, Published by Wiley Periodicals, Inc., DOI: 10.1002/bltj.21522; http://onlinelibrary.wiley.com/doi/10.1002/bltj.21522/pdf.

(Continued)

*Primary Examiner* — Gbemileke J Onamuti
(74) *Attorney, Agent, or Firm* — Patent Capital Group

(57) ABSTRACT

An apparatus includes an interference rejection combining module, at least partially implemented in hardware. The interference rejection combining module determines a covariance based on a Hermitian transpose of a signal received on a subcarrier of a symbol that is not a pilot symbol.

21 Claims, 5 Drawing Sheets

(56) References Cited

U.S. PATENT DOCUMENTS

2012/0163512 A1* 6/2012 Johansson ............ H04J 11/0046
                                                                    375/340
2016/0013878 A1* 1/2016 Zhao ................. H04L 25/03968
                                                                    370/329
2016/0028558 A1* 1/2016 Guo ...................... H04L 25/021
                                                                    370/252

OTHER PUBLICATIONS

EPO Nov. 6, 2015 Search Report and Written Opinion from European Application Serial No. 15177724.0; 6 pages.

* cited by examiner

SYSTEM, METHOD, AND PROGRAM FOR ROBUST INTERFERENCE REJECTION COMBINING

TECHNICAL FIELD

This disclosure relates in general to the field of interference mitigation in wireless telecommunications and, more particularly, to improved interference rejection combining.

BACKGROUND

Telecommunications customers increasingly demand high-quality voice and data communications over cellular and wireless local area networks (LANs). Deployment of small cells in such LANs can give cell-splitting capacity gains. Thus, small cells are projected to become increasingly prevalent, as mobile network operators use these small cells to increase the capacities of their networks.

Due to their small coverage area, many small cells might be placed in close proximity to each other. Absent inter-network communication, those small cell networks might use the same time and frequency resources to transmit information. Granting users of these networks the same time-frequency resources can lead to interference, such as collisions.

In a dense deployment of small cells, co-channel interference between adjacent cells can be a limiting factor. Indeed, co-channel interference is the primary impediment in dense wireless networks, as out-of-band interference can be rejected using simple filtering.

Interference mitigation or rejection can improve signal reception in the presence of such interference. Specifically, co-channel interference can be mitigated using interference rejection combining (IRC). IRC uses spatial degrees of freedom (i.e., multiple antennas) at an Evolved Node B (also known as an eNodeB, an access point, or an AP) to exploit spatial covariance of the interference.

Conventionally, IRC assumes interference and a desired signal are synchronous (i.e., the interference is stationary). This assumption is highly idealized and might not be true in practice.

Further, in a dense wireless network, the exact properties of the spatial covariance of the interference might not be known at the point the signal is processed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
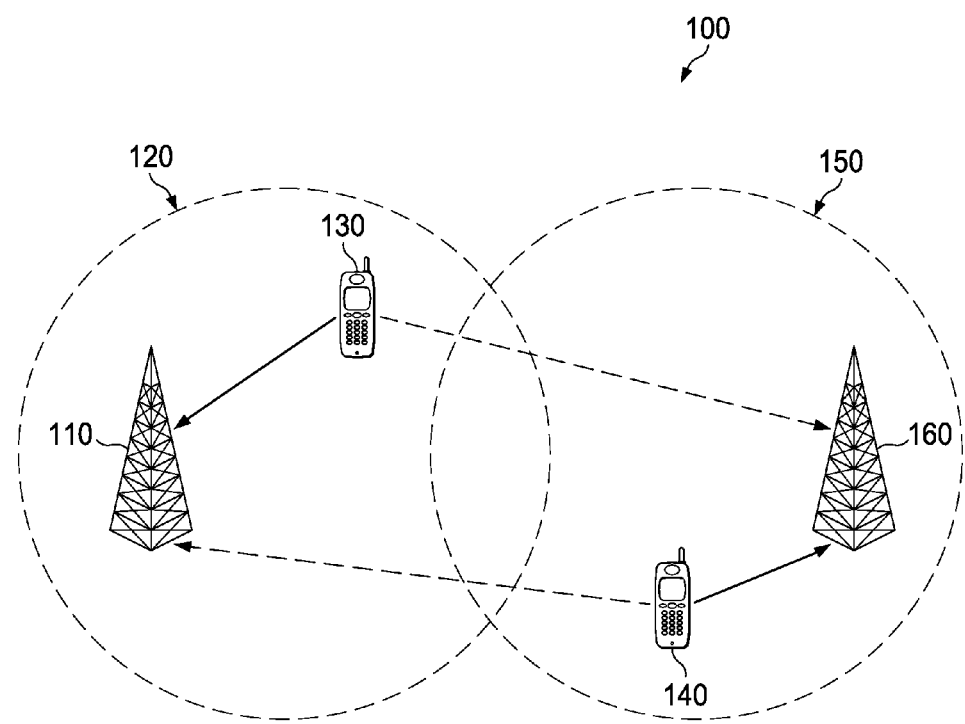
FIG. 1 illustrates a system in which aspects of the disclosure can be implemented.

Conventional interference rejection can be complicated by the desired signal and the interference only partially overlapping in time. That the overlap is only partial results in the properties of the interference changing during the time the desired signal is received (i.e., the interference might be asynchronous). Conventional techniques perform poorly in the presence of such non-stationary interference, necessitating time synchronization.

This disclosure makes no assumptions on the synchronicity of the interference with respect to the desired signal. Accordingly, this disclosure describes signal processing techniques to mitigate asynchronous interference in a wireless orthogonal frequency-division multiplexing (OFDM) system, such as a Long-Term Evolution (LTE) system.

In one embodiment, an apparatus is provided and includes an interference rejection combining module, at least partially implemented in hardware, the interference rejection combining module configured to determine a first covariance based on a Hermitian transpose of a signal received on a subcarrier of a symbol that is not a pilot symbol.

The interference rejection combining module can optionally determine, based on the first covariance, an equalizer weight for an uplink of a Long-Term Evolution (LTE) system that mitigates asynchronous interference. The interference rejection combining module can optionally be configured to compute an equalizer weight on a per-resource block (RB), per-orthogonal frequency-division multiplexing (OFDM) symbol basis by directly averaging a vector of the signal to compute the first covariance, the first covariance to be used in a minimum mean square error (MMSE) receiver. The interference rejection combining module can optionally be configured to set a flag to indicate whether a channel on which the signal is received has a time-frequency coherence exceeding a predetermined threshold.

The interference rejection combining module can optionally be configured to determine the first covariance ($R_{yy}$) as $$R_{yy}(p) = \Sigma_i y_{i,p} y_{i,p}^H$$

where $y_{i,p}$ is a vector of size M and is the signal received on the i-th subcarrier of the p-th symbol, H represents the Hermitian transpose operation, and M is a number of antennas that received the signal. The interference rejection combining module can optionally be configured to determine a second covariance equal to $h^H$, where h is a channel estimate determined from a pilot symbol of the signal, and H represents the Hermitian transpose operation. The interference rejection combining module can optionally determine the first covariance further based on a product of a tuning factor and an M×M identity matrix, where M is a number of antennas that received the signal.

In another embodiment, a method is provided and is implemented by an apparatus, the method comprising determining a Hermitian transpose of a signal received on a subcarrier of a symbol that is not a pilot symbol; and determining, with the apparatus, a first covariance based on the Hermitian transpose of the signal.

In a further embodiment, one or more non-transitory, computer-readable storage media are encoded with software comprising computer executable instructions that, when executed, cause a processor to perform a method comprising determining a Hermitian transpose of a signal received on a subcarrier of a symbol that is not a pilot symbol; and determining a first covariance based on the Hermitian transpose of the signal.

Example Embodiments

Some embodiments of this disclosure can robustly perform interference rejection combining by exploiting information about interference embedded within the signals being processed. Some embodiments of this disclosure allow suppression of co-channel interference, thereby improving reception of the desired signal and therefore improving wireless network coverage and capacity. Thus, in some embodiments, this disclosure can provide an advantage in a dense deployment of an LTE (cellular) system with poor synchronization between adjacent neighbors, where transmitted interference might be asynchronous with the desired signal.

Some embodiments demonstrate a significant gain in performance in the low signal-to-interference ratio regime, translating to improved wireless network capacity and coverage.

In one example, the proposed equalizer attempts to apply spatial whitening to a MMSE receiver. Conventionally, a MMSE receiver is formulated based on an estimate of a channel, as well as an estimated noise and interference covariance matrix derived from pilot symbols in the middle of an LTE frame, and by combining the two estimates. IC vendors conventionally take this approach, although it breaks down when the symbol being equalized sees different interference from the interference when the interference covariance matrix was estimated.

One example of this disclosure formulates a MMSE receiver on a per-symbol basis. In this receiver, the noise and interference covariance matrix is not estimated separately, but is estimated jointly with the data as part of the MMSE formulation, by appropriately averaging the received signals. What enables this approach is the good time-frequency coherence seen in dense deployments, such as indoor channels. This approach can give a robust estimate of $R_{yy}$ by directly averaging the received signal. Traditional LTE systems deployed for outdoor propagation conditions do not necessarily leverage this aspect. Since small-cells are expected to be deployed indoors with significant asynchronous intra-cell interference, some implementations of the proposed technique can deliver a significant gain.

FIG. 1 illustrates a system 100 in which aspects of the disclosure can be implemented. The system 100 includes two cells: cell 120 and cell 150. Cell 120 is defined by the communication area of eNodeB 110 (e.g., an AP) and includes node (e.g., user equipment) 130. Cell 150 is defined by the communication area of eNodeB 160 (e.g., an AP) and includes node (e.g., user equipment) 140. When node 130 communicates a signal to eNodeB 110 (e.g., through an uplink channel), eNodeB 160 might receive the signal from node 130 due to the strength of the signal and the proximity of eNodeB 160 to node 130. Similarly, when node 140 communicates a signal to eNodeB 160, eNodeB 110 might receive the signal from node 140.

In addition, eNodeB 110 and eNodeB 160 do not necessarily communicate with each other. Thus, although eNodeB 110 can coordinate time and frequency resources within cell 120 and eNodeB 160 can coordinate time and frequency resources within cell 150, eNodeB 110 and eNodeB 160 might not coordinate time and frequency resources across cells 120 and 150. Thus, eNodeB 110 might grant the same time and frequency resources to node 130 in cell 120, as the time and frequency resources granted by eNodeB 160 to node 140 in cell 150. If node 130 and node 140 use the same or similar time and frequency resources, eNodeB 110 might see a collision between signals from node 130 and node 140. Similarly, eNodeB 160 might see a collision between signals from node 130 and node 140.

To remedy this situation, eNodeB 110 and eNodeB 160 can perform interference rejection combining (IRC). However, conventional IRC has numerous shortcomings, as detailed below. The following foundational information is offered earnestly for purposes of teaching only and, therefore, should not be construed in any way to limit the applications of the present disclosure.

In many cases, interference is non-stationary: interferer power in a certain frequency band generally varies randomly with time. For example, in wireless LAN networks, the interference varies because the transmissions are inherently asynchronous. Further, in cellular networks, the interference varies because of the way the resources are used by the scheduler and power control, especially in the uplink.

IRC receivers are extensions of the minimum mean square error (MMSE) class of receivers with the additional operability of whitening spatial interference plus noise (assuming the degrees of freedom exploited for interference suppression are spatial).

Whitening the spatial noise generally requires statistics of the interferer(s) to be captured in a covariance matrix. The quality of the estimation of the covariance matrix determines the performance of the IRC receivers.

Constructing the covariance matrix generally requires apriori knowledge or assumptions on the time-frequency location of the interferer. For example, if the interferer is transient and a covariance matrix is computed based on long-term temporal averages, then the performance for signals that experience significant interference could be poor. Alternatively, if the interferer is localized in frequency, but the covariance matrix is computed based on wideband statistics, then the performance could also be poor.

Modulation for data in an LTE uplink is SC (Single-Carrier)-FDMA (Frequency Division Multiple Access). The basic multiple access unit is the physical resource block (PRB). Each PRB is 12 subcarriers wide and logically spans a sub-frame duration consisting of 14 SC-FDMA symbols. Assuming inter-slot hopping might be active, analysis is restricted to a single slot (i.e., 7 symbols), as interest in IRC-related processing generally concerns only equalization.

Figure 2:
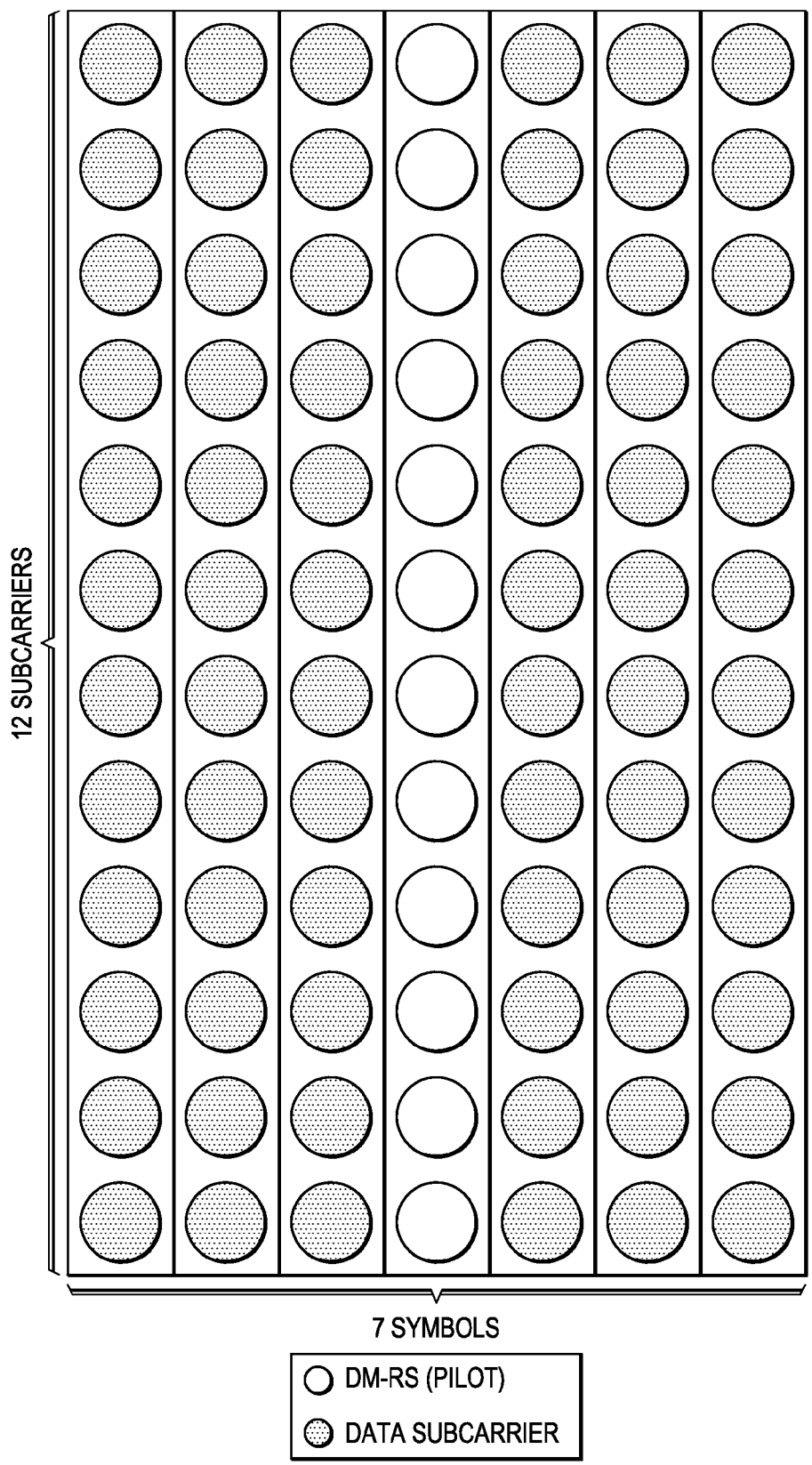
FIG. 2 illustrates an example of a physical resource block.

FIG. 2 illustrates an example of a PRB. The PRB shown in FIG. 2 includes 12 subcarriers and 7 symbols. In the PRB shown in FIG. 2, the fourth symbol includes 12 pilot symbols; the other six symbols of the PRB include a total of 72 data subcarriers that are not necessarily pilot symbols.

An uplink signal received for a single layer uplink transmission, assuming M receiving antennas at the AP, can be modeled as shown in Eq. (1).

$$y_{i,p} = h_{i,p} x_{i,p} + z_{i,p} \quad i=1,2,\ldots,12 \; p=1,2,\ldots,7 \qquad \text{Eq. (1)}$$

where $y_{i,p}$ is a vector of size M and is the signal received on the i-th subcarrier of the p-th symbol, $h_{i,p}$ is a vector of size M and is the wireless channel for the i-th subcarrier of the p-th symbol, $x_{i,p}$ is a scalar (or a 1×1 vector) data/pilot symbol transmitted on the i-th subcarrier of the p-th symbol, and $z_{i,p}$ is a vector of size M and is the noise and interference on the i-th subcarrier of the p-th symbol.

A classical equalizer that equalizes a Single-Input Multiple-Output (SIMO) channel uses maximum ratio combining (MRC). It is assumed the noise and interference are spatially white, i.e., independent and identically distributed across the receiving antennas, for MRC to be optimal. The weighting w of the equalizer is shown in Eq. (2).

$$w_{i,p}^{MRC} = h_{i,p}^{H} / (h_{i,p}^{H} h_{i,p}) \qquad \text{Eq. (2)}$$

where H represents the Hermitian transpose or Hermitian adjoint (i.e., the complex conjugate transposed). In practice, $h_{i,p}$ will be replaced by a channel estimate derived from pilot subcarriers.

While it is reasonable to assume noise across the receiving antennas is spatially white, the same does not hold for interference.

Assuming the noise and interference covariance matrix is $C_{i,p}$ and is known to the receiver, the optimal receiver is a MMSE receiver. Eq. (3) defines, as a function of two covariance matrices, a weight to be applied in the MMSE receiver. Eq. (4) defines a first covariance matrix $R_{xy}$, and Eq. (5) defines a second covariance matrix $R_{yy}$.

$$w_{i,p}^{MMSE} = (R_{xy} R_{yy}^{-1})/(R_{xy} R_{yy}^{-1} h_{i,p}) \quad \text{Eq. (3)}$$

$$R_{xy} = E[x \, y^H] = h_{i,p}^H \quad \text{Eq. (4)}$$

$$R_{yy} = E[y \, y^H] = h_{i,p} h_{i,p}^H + C_{i,p} \quad \text{Eq. (5)}$$

where $E[.]$ is the expectation operator.

The MMSE and MRC receivers have identical performance when the noise and interference is spatially white.

In a dense small-cell environment, interference is expected to be non-stationary across symbols because (1) time-frequency resources are not necessarily synchronized (e.g., are randomly allocated) to users in neighboring cells (thereby possibly interfering), (2) slot (e.g., PRB) boundaries might not be aligned across cells, and (3) interfering users' powers might vary randomly.

Figure 3:
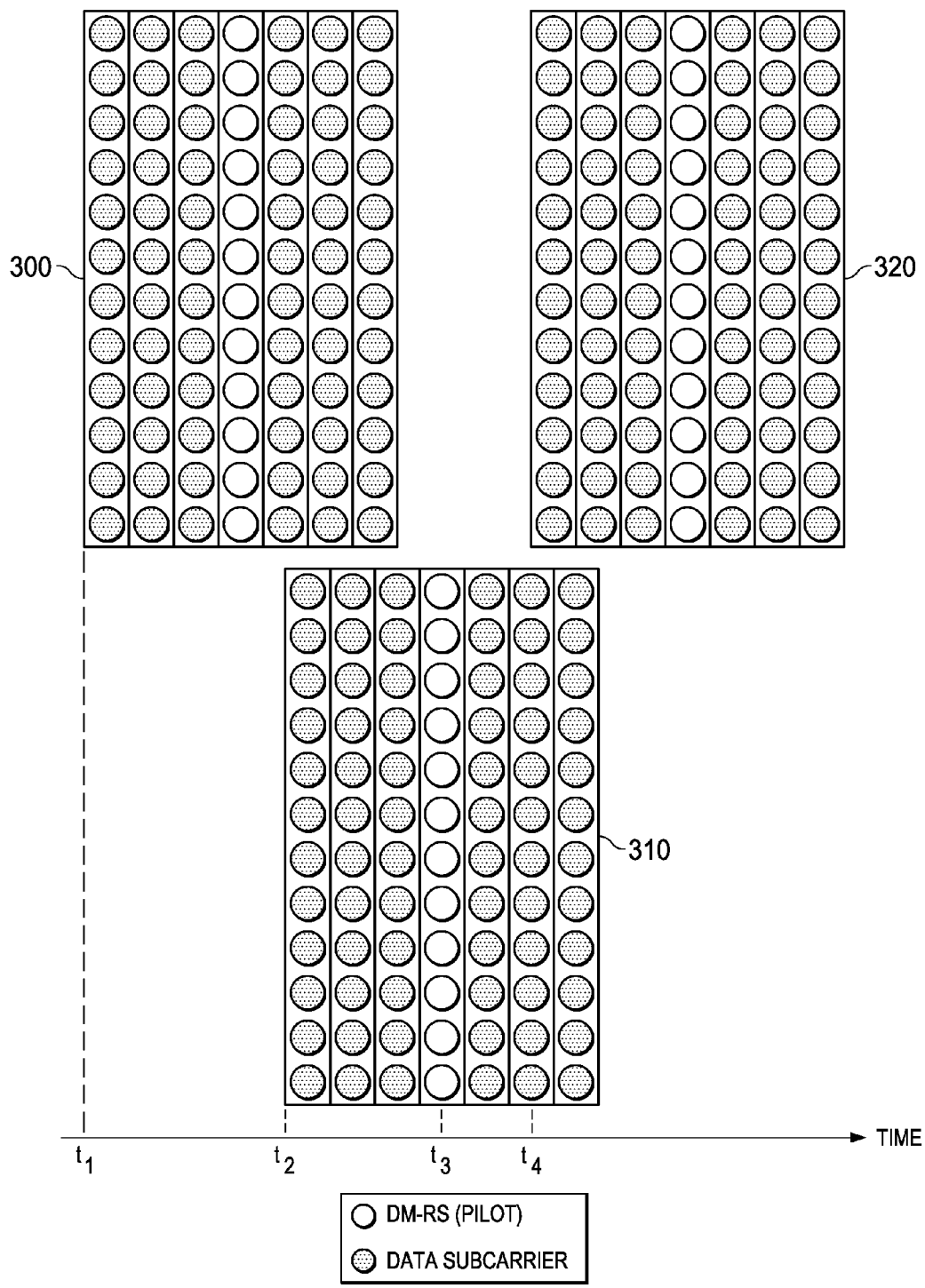
FIG. 3 illustrates an example of asynchronous interference over time.

FIG. 3 illustrates an example of asynchronous interference over time. An AP (e.g., AP 110) begins receiving PRB 300 at time $t_1$. At time $t_2$, the AP begins receiving PRB 310. As illustrated in FIG. 3, the AP continues to receive symbols from PRB 300 at time $t_2$, thereby resulting in interference with PRB 310. At time $t_3$, the AP receives the pilot symbols from PRB 310. At time $t_4$, the AP begins receiving PRB 320 and continues to receive symbols from PRB 310, thereby also resulting in interference with PRB 310. Thus, PRB 310 experiences different interference between $t_2$ and $t_3$ and between $t_3$ and $t_4$.

Although pilot symbols are conventionally used to estimate a sum of interference and noise, as illustrated in FIG. 3, interference for a data symbol (e.g., at $t_2$ or $t_4$) might be different from that experienced by the pilots (e.g., at $t_3$). Therefore, the conventional estimated values might be of little relevance to the data subcarrier being equalized, resulting in an inaccurate equalization.

Further, with limited degrees of freedom, estimating the noise and interference covariance matrix for every symbol is challenging, if not impossible.

For a best IRC performance (e.g., interference and noise) covariance matrix, covariance matrix $C_{i,p}$ may be assumed to be non-stationary in time but stationary in frequency (i.e., at least across the PRB), that is., $C_{i,p} \sim C_p$.

While the covariance matrix $R_{xy}$ can be calculated analytically as $h^H$, the covariance matrix $R_{yy}$ can be estimated empirically on a per-symbol basis, as shown in Eq. (6).

$$R_{yy}(p) = \Sigma_i y_{i,p} y_{i,p}^H \quad \text{Eq. (6)}$$

Figure 4:
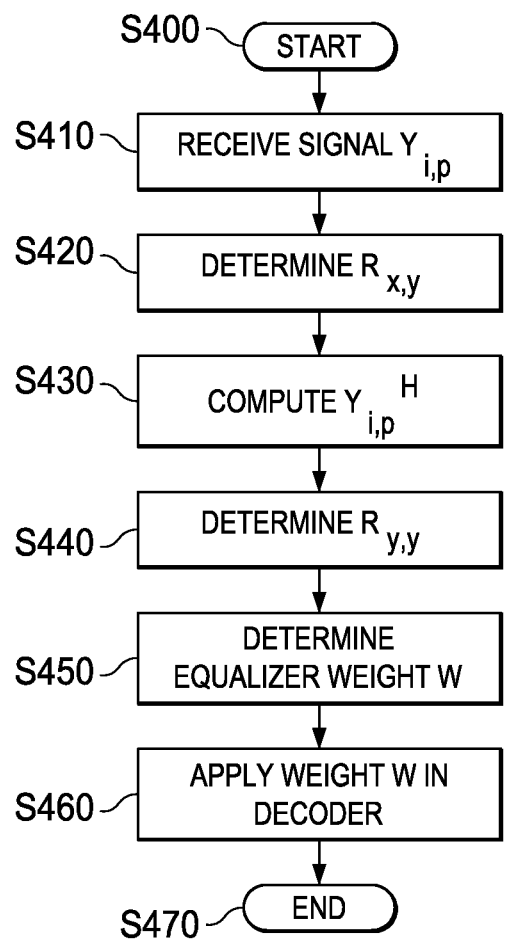
FIG. 4 illustrates an algorithm for implementing aspects of the disclosure.

Thus, FIG. 4 illustrates an algorithm for implementing aspects of the present disclosure. The operations begin at S400 and proceed to S410. At S410, M antennas of an AP receive signal $y_{i,p}$ as the signal received on the i-th subcarrier of the p-th symbol.

At S420, an IRC module determines the covariance matrix $R_{xy}$. In one embodiment, the covariance matrix $R_{xy}$ is equal to $E[x \, y^H]$, where E represents the expectation operator, x represents the transmitted data or pilot symbols, y represents the received signal, and H represents the Hermitian transpose or Hermitian adjoint (i.e., the complex conjugate transposed) as defined in Eq. (4). In another embodiment, the covariance matrix $R_{xy}$ is equal to $h^H$, where h is the channel estimate determined from a pilot symbol.

At S430, the IRC module computes $y_{i,p}^H$. That is, the IRC module determines the Hermitian transpose of the signal y received on the i-th subcarrier of the p-th symbol at S410.

At S440, the IRC module determines the covariance matrix $R_{yy}$. In one embodiment, the IRC module uses Eq. (7) to compute the covariance matrix $R_{yy}$.

$$R_{yy}(p) = \Sigma_i y_{i,p} y_{i,p}^H \quad \text{Eq. (7)}$$

Although Eq. (7) indicates a sum of $y_{i,p} y_{i,p}^H$, the IRC module can also determine the covariance matrix $R_{yy}$ based on an average of $y_{i,p} y_{i,p}^H$, because the average is merely off from the sum of $y_{i,p} y_{i,p}^H$ by a scaling factor.

At S450, the IRC module determines an equalizer weight w using Eq. (8).

$$w_{i,p}^{MMSE} = (R_{xy} R_{yy}^{-1})/(R_{xy} R_{yy}^{-1} h_{i,p}) \quad \text{Eq. (8)}$$

where $R_{xy}$ was determined in S420 and $R_{yy}$ was determined in S440.

At S460, the IRC module applies the equalizer weight w in a filter. For example, w x y can be fed to a decoder to decode a current frame. Of course, it is not necessary that the IRC module itself apply the equalizer weight. In one embodiment, the IRC module merely transmits the equalizer weight w to an equalizer.

The operations then conclude in S470.

The algorithm of FIG. 4 can result in a significant gain in a high-interference regime. In low- or moderate-interference regimes, numerical accuracies from finite averaging may limit performance. The above estimation procedure might suffer from inaccuracies of finite averaging. The estimation can be improved with knowledge of the stationarity of the interference profile but such is beyond the scope of this discussion.

Figure 5:
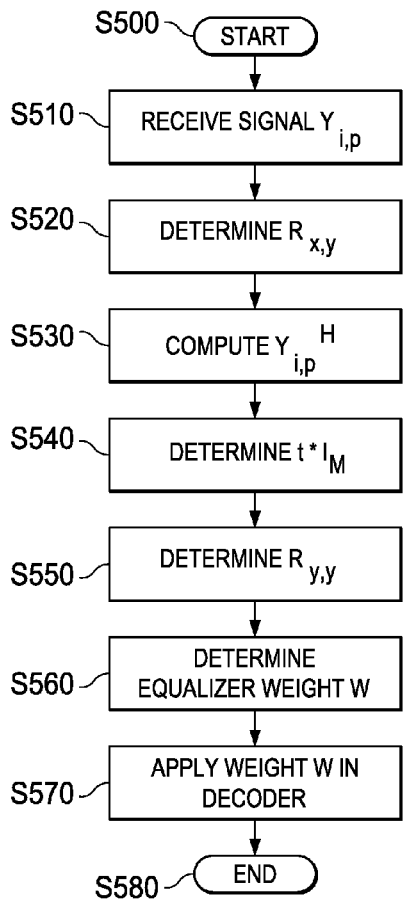
FIG. 5 illustrates another algorithm for implementing aspects of the disclosure.

An empirical tuning factor can be introduced to balance inaccuracies from the numerical estimation to obtain further gains from IRC. FIG. 5 illustrates another algorithm for implementing aspects of the disclosure.

The operations begin at S500 and proceed to S510. At S510, M antennas of the AP receive the signal $y_{i,p}$ as the signal received on the i-th subcarrier of the p-th symbol.

At S520, the IRC module determines the covariance matrix $R_{xy}$. In one embodiment, the covariance matrix $R_{xy}$ is again equal to $E[x \, y^H]$. In one example, $R_{xy}$ is again equal to $h^H$.

At S530, the IRC module determines $y_{i,p}^H$. That is, the IRC module determines the Hermitian transpose of the signal y received on the i-th subcarrier of the p-th symbol at S510.

At S540, the IRC module determines the product of an empirical tuning factor t and an M×M identity matrix $I_M$.

At S550, the IRC module determines the covariance matrix $R_{yy}$. In one embodiment, the IRC module uses Eq. (9).

$$R_{yy}(p) = \Sigma_i y_{i,p} y_{i,p}^H + t \, I_M \quad \text{Eq. (9)}$$

where $I_M$ is the M×M identity matrix, and t is the empirical tuning factor multiplied in S540.

Although Eq. (9) indicates a sum of $y_{i,p} y_{i,p}^H$, the IRC module can also determine the covariance matrix $R_{yy}$ based on an average of $y_{i,p} y_{i,p}^H$, because the average of $y_{i,p} y_{i,p}^H$ is merely off from the sum by a scaling factor.

At S560, the IRC module determines the equalizer weight w using Eq. (10).

$$w_{i,p}^{MMSE}=(R_{xy}R_{yy}^{-1})/(R_{xy}R_{yy}^{-1}h_{i,p}) \qquad \text{Eq. (10)}$$

where $R_{xy}$ was determined in S520 and $R_{yy}$ was determined in S550.

At S570, the IRC module applies the equalizer weight w in a filter. For example, w×y can be fed to a decoder to decode a current frame. Of course, the IRC module can alternatively transmit the equalizer weight w to an equalizer.

The operations then conclude in S580.

The tuning factor t is not necessarily determined dynamically in S540. For example, a static and programmable tuning factor can appropriately trade off performance between interference and noise-limited regions (e.g., suppress strong interference while not deviating drastically from maximum ratio combining (MRC) in the noise-limited region). The range of the tuning factor might depend on the fixed-point implementation of the hardware that embodies aspects of this disclosure. Finally, the tuning factor can be adjusted through experiments in a field deployment.

Thus, robust IRC can be designed to improve the performance of an LTE uplink. The idea is applicable to scenarios in wireless LAN networks as well.

Figure 6:
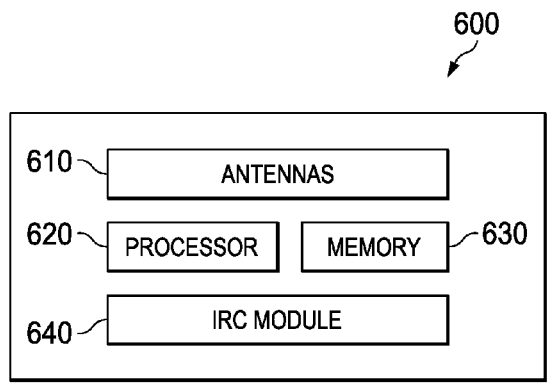
FIG. 6 illustrates an exemplary AP in which aspects of the disclosure can be implemented.

FIG. 6 illustrates an exemplary AP 600 (e.g., eNodeB 110) in which aspects of the present disclosure can be implemented. AP 600 includes M antennas 610 (i.e., antennas #1-M), a processor 620, a memory 630, and an IRC module 640.

The M antennas 610 receive signals (e.g., y) from nodes, particularly nodes (e.g., node 130) within a particular cell (e.g., cell 120). As discussed above, the M antennas can also receive signals from nodes outside the cell (e.g., from node 140). The M antennas 610 are an example of a receiving means.

The processor 620 processes information received from the M antennas 610. For example, the processor 620 can extract pilot symbols from PRBs. Further, the processor 620 can decode information such as subcarriers and pilot symbols received from the M antennas 610. The processor 620 is an example of a processing means.

The memory 630 stores data received from the M antennas 610 and the processor 620 and retrieves data to be processed by the processor 620. In some embodiments, the memory 630 stores information to be transmitted over the M antennas 610. The memory 630 is an example of a storing means.

The IRC module 640 executes operations to perform algorithms of this disclosure, particularly those described with reference to FIGS. 4-5. The IRC module 440 can receive information from the M antennas 610 and store information to and retrieve information from the memory 630. The IRC module 640 can also interact with the processor 620, such as by controlling or being controlled by the processor 620. In this regard, the IRC module 640 can exchange data with the processor 620 by a bus (not pictured). The IRC module 640 is also an example of a storing means.

Of course, the AP 600 can be modified in any suitable manner to perform the algorithms described previously. For example, the AP 600 can have more than the M antennas used in the algorithms performed by IRC module 640. In addition, although FIG. 6 illustrates the IRC module 640 as separate from the processor 620 and the memory 630, this illustration is merely for explanatory purposes. For example, the IRC module 640 can be implemented within the processor 620. In addition, the IRC module 640 can be implemented on a processor separate from the processor 620. The IRC module 640 can be implemented as software, hardware, or a combination of both. The IRC module 640 can include the memory 630, and the memory 630 can include the IRC module 640 (when the IRC module 640 is implemented in software).

Embodiments of this disclosure can be implemented in small cell wireless SoCs (system on chip) for LTE small cells. Such SoCs can be purchased from semiconductor vendors. Algorithms can also be implemented in digital signal processors (DSPs) with the assistance of the SoC vendor.

In terms of the system discussed herein, the nodes 130 and 140 can be any apparatus associated with clients or customers initiating a communication in system 100 via some network. The term "node" is interchangeable with the terminology "endpoint" and "user equipment (UE)," where such terms include devices that initiate a communication, such as a computer, a personal digital assistant (PDA), a laptop or electronic notebook, an Apple iPad, a cellular telephone (such as a smartphone, including an Apple iPhone, a Google Android device, a Microsoft Windows phone, or a BlackBerry phone), an IP phone, or any other device, component, element, or object that initiates voice, audio, video, media, or data exchanges within system 100.

The node can include an interface to a human user, such as a microphone, a speaker, a display (especially a touchscreen), a keyboard, or other terminal equipment. The apparatus can also be any device that seeks to initiate a communication on behalf of another entity or element, such as a program, a database, or any other component, device, element, or object that initiates an exchange within system 100. The term "data," as used herein, refers to any type of numeric, voice, video, or script data, or any type of source or object code, or any other information in any format that can be communicated from one point to another. The apparatus can communicate wirelessly using a macro service. As the apparatus is moved from one location to another, a hand-off can be made between the APs or network elements (or to macro cell towers), enabling the user to experience continuous communication capabilities.

Each AP or node can perform actions to offer connectivity to one or more wireless devices using any standard, protocol, or technique. For example, each AP can be an eNodeB that allows wireless devices to connect to a wired network using Wi-Fi, Bluetooth, WiMAX, UMTS, or any other appropriate standard. Hence, the term "access point" includes any wireless access point (WAP), a femtocell, a hotspot, a picocell, a Wi-Fi array, a wireless bridge (e.g., between networks sharing a same Service Set Identifier (SSID) and radio channel), a wireless local area network (LAN), or any other suitable access device capable of providing connectivity to a wireless device. In certain cases, the access point connects to a router (via a wired network), and it can relay data between the wireless devices and wired devices of the network.

In one example implementation, the node and the AP are network elements that facilitate or otherwise help coordinate the interference rejection combining activities discussed herein (e.g., for networks such as those illustrated in FIG. 1). As used in this Specification, the term "network element" is interchangeable with "apparatus." Further, the term "network element" is meant to encompass network appliances, servers, routers, switches, gateways, bridges, loadbalancers, firewalls, processors, modules, base stations, or any other suitable device, component, element, or object operable to exchange information in a network environment. Moreover, a network element can include any hardware, software, or combination thereof, as well as any components, modules, interfaces, or objects that facilitate the operations of the hardware or software. Thus, a network element can include algorithms and communication protocols that allow for the exchange of data or information or allow for interference rejection combining.

In one example implementation, the node and the AP include software to achieve the interference rejection combining outlined in this document. In other embodiments, the interference rejection combining can be provided external to the node or the AP or can be included in some other network device to achieve this functionality. Alternatively, both elements can include software (or reciprocating software) that can coordinate to achieve the operations, as outlined in this specification.

In regards to the internal structure associated with system architecture 100, each of the node and/or the AP can include memory elements for storing information (e.g., software, logic, code, processor instructions) executed to carry out the interference rejection combining outlined herein. These memory elements can include, e.g., random access memory (RAM), read only memory (ROM), an erasable programmable read only memory (EPROM), an electrically erasable programmable ROM (EEPROM), software, and/or hardware. The information being tracked or sent to the node and/or AP can be provided in any database, register, control list, cache, or storage structure. Any of the memory items discussed herein should be construed as encompassed within the term "memory element."

Additionally, each of the AP and the node can include a processor (including an application specific integrated circuit (ASIC), a digital signal processor (DSP), a field programmable gate array (FPGA), a PAL, or a GAL) that can execute software, instructions, or an algorithm (particularly, those of FIGS. 4-5) to perform the interference rejection combining discussed in this Specification. Similarly, any of the processing elements, modules, and machines described in this Specification should be construed as encompassed within the term "processor."

Each of the network elements can also include one or more interfaces for receiving, transmitting, and/or otherwise communicating data or information in a network environment.

In certain example implementations, the interference rejection combining functions outlined herein can be implemented by logic (e.g., embedded logic provided in an ASIC, instructions for a DSP, software [whether object code and source code]) encoded in one or more tangible, non-transitory media (e.g., a memory element) to be executed by a processor, ASIC, DSP, or other similar machine. In another example, the interference rejection combining activities outlined herein can be implemented with fixed logic or programmable logic (e.g., software/computer instructions executed by a processor), and the elements identified herein could be some type of a programmable processor, programmable digital logic (e.g., an FPGA, an EPROM, an EEPROM) or an ASIC that includes digital logic, software, code, electronic instructions, or any suitable combination thereof. The non-transitory medium can be a compact disk, a digital versatile disk, a Blu-Ray disk, a jump drive, or other media.

The logic can also be implemented in a transitory medium, such as a propagating wave, a telecommunications line, or as software itself.

The software processed by the processor(s) can also be executed as an executable file installed by an installation program that has been downloaded and executed. Thus, the software executed might not be the same as the software downloaded. Accordingly, a server can store software that, when executed, causes the node or AP to install an executable file that, upon its execution, executes the operations of the present disclosure.

With the examples provided above, as well as numerous other examples provided herein, interaction can be described in terms of two, three, or four network elements. However, this has been done for purposes of clarity and example only. In certain cases, it might be easier to describe one or more of the functionalities of a given set of flows by only referencing a limited number of network elements. It should be appreciated that system architecture 100 (and its features) are scalable and further can accommodate a large number of components, as well as more complicated/sophisticated arrangements and configurations. Accordingly, the examples provided should not limit the scope or inhibit the features of system architecture 100 as applied to a myriad of other architectures.

The previously described activities illustrate only some of the possible processing scenarios and patterns that can be executed by, or within, system architecture 100. Some of these steps can be deleted or removed where appropriate, or these steps can be modified or changed considerably without departing from the scope of the present disclosure. In addition, a number of these operations have been described as being executed concurrently with, or in parallel to, one or more additional operations. However, the timing of these operations can be altered considerably. The preceding operational flows have been offered for purposes of example and discussion. Substantial flexibility is provided by system architecture 100 in that any suitable arrangements, chronologies, configurations, and timing mechanisms can be provided without departing from the teachings of the present disclosure.

Numerous other changes, substitutions, variations, alterations, and modifications can be ascertained by one skilled in the art. It is intended the present disclosure encompasses all such changes, substitutions, variations, alterations, and modifications as falling within the scope of the appended claims. To assist the United States Patent and Trademark Office (USPTO) and, additionally, any readers of any patent issued on this disclosure in interpreting the claims appended hereto, Applicant wishes to note the Applicant: (a) does not intend any of the appended claims to invoke 35 U.S.C. section 112(f) as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   a plurality of antennas that receive a signal on a subcarrier of a symbol that is not a pilot symbol; and
   an interference rejection combining module, at least partially implemented in hardware, the interference rejection combining module configured to determine a first covariance based on a Hermitian transpose of the signal, to determine a second covariance, and to determine, based on an inverse of the first covariance and based on the second covariance, an equalizer weight.

2. The apparatus of claim 1, wherein the equalizer weight is for an uplink of a Long-Term Evolution (LTE) system that mitigates asynchronous interference.

3. The apparatus of claim 1, wherein the interference rejection combining module is configured to compute the equalizer weight on a per-resource block (RB), per-orthogonal frequency-division multiplexing (OFDM) symbol basis by directly averaging a vector of the signal to compute the first covariance, the first covariance to be used in a minimum mean square error (MMSE) receiver.

4. The apparatus of claim 1, wherein the interference rejection combining module is configured to set a flag to indicate whether a channel on which the signal is received has a time-frequency coherence exceeding a predetermined threshold.

5. The apparatus of claim 1, wherein the interference rejection combining module is configured to determine the first covariance ($R_{yy}$) as $$R_{yy}(p) = \Sigma_i y_{i,p} y_{i,p}^H$$

where $y_{i,p}$ is a vector of size M and is the signal received on the i-th subcarrier of the p-th symbol, H represents the Hermitian transpose operator, and M is a number of the plurality of antennas.

6. The apparatus of claim 1, wherein the interference rejection combining module is configured to determine the second covariance is equal to $h^H$, where h is a channel estimate determined from a pilot symbol of the signal, and H represents the Hermitian transpose operator.

7. The apparatus of claim 1, wherein the interference rejection combining module determines the first covariance further based on a product of a tuning factor and an M×M identity matrix, where M is a number of antennas that received the signal.

8. The apparatus of claim 1, wherein the interference rejection combining module is configured to determine the second covariance is equal to $E[x\ y^H]$, where E represents the expectation operator, x represents transmitted data or pilot symbols, y represents the received signal, and H represents the Hermitian transpose operator.

9. A method implemented by an apparatus, the method comprising:
  determining a Hermitian transpose of a signal received on a subcarrier of a symbol that is not a pilot symbol;
  determining, with the apparatus, a first covariance based on the Hermitian transpose of the signal;
  determining a second covariance; and
  determining, based on an inverse of the first covariance and based on the second covariance, an equalizer weight.

10. The method of claim 9, wherein the equalizer weight is for an uplink of a Long-Term Evolution (LTE) system that mitigates asynchronous interference.

11. The method of claim 9, further comprising:
  computing the equalizer weight on a per-resource block (RB), per-orthogonal frequency-division multiplexing (OFDM) symbol basis by directly averaging a vector of the signal to compute the first covariance, the first covariance to be used in a minimum mean square error (MMSE) receiver.

12. The method of claim 9, further comprising:
  setting a flag to indicate whether a channel on which the signal is received has a time-frequency coherence exceeding a predetermined threshold.

13. The method of claim 9, wherein the first covariance ($R_{yy}$) is determined as $$R_{yy}(p) = \Sigma_i y_{i,p} y_{i,p}^H,$$

where $y_{i,p}$ is a vector of size M and is the signal received on the i-th subcarrier of the p-th symbol, H represents the Hermitian transpose operator, and M is a number of antennas that received the signal.

14. The method of claim 9, further comprising:
  determining the second covariance is equal to $h^H$, where h is a channel estimate determined from a pilot symbol of the signal, and H represents the Hermitian transpose operator.

15. The method of claim 9, wherein the first covariance is determined based on a product of a tuning factor and an M×M identity matrix, where M is a number of antennas that received the signal.

16. One or more non-transitory, computer-readable storage media encoded with software comprising computer executable instructions that, when executed, cause a processor to perform a method comprising:
  determining a Hermitian transpose of a signal received on a subcarrier of a symbol that is not a pilot symbol;
  determining a first covariance based on the Hermitian transpose of the signal;
  determining a second covariance; and
  determining, based on an inverse of the first covariance and based on the second covariance, an equalizer weight.

17. The media of claim 16, wherein the equalizer weight is for an uplink of a Long-Term Evolution (LTE) system that mitigates asynchronous interference.

18. The media of claim 16, the operations further comprising:
  computing the equalizer weight on a per-resource block (RB), per-orthogonal frequency-division multiplexing (OFDM) symbol basis by directly averaging a received signal vector to compute the first covariance, the first covariance to be used in a minimum mean square error (MMSE) receiver.

19. The media of claim 16, wherein the first covariance ($R_{yy}$) is determined as $$R_{yy}(p) = \Sigma_i y_{i,p} y_{i,p}^H,$$

where $y_{i,p}$ is a vector of size M and is the signal received on the i-th subcarrier of the p-th symbol, H represents the Hermitian transpose operator, and M is a number of antennas that received the signal.

20. The media of claim 16, the operations further comprising:
  determining the second covariance is equal to $h^H$, where h is a channel estimate determined from a pilot symbol of the signal, and H represents the Hermitian transpose operator.

21. The media of claim 16, wherein the interference rejection combining module determines the first covariance further based on a product of a tuning factor and an M×M identity matrix, where M is a number of antennas that received the signal.

* * * * *